United States Patent [19]

Kawatsuki et al.

[11] Patent Number: 4,759,607
[45] Date of Patent: Jul. 26, 1988

[54] PHASE GRATINGS OF A COMBINATION PATTERN-REFRACTION MODIFICATION TYPE

[75] Inventors: Nobuhiko Kawatsuki; Masao Uetsuki, both of Kurashiki, Japan

[73] Assignees: Kuraray Co., Ltd.; Toshiba Corp., both of Japan

[21] Appl. No.: 921,588

[22] Filed: Oct. 21, 1986

[30] Foreign Application Priority Data

Oct. 22, 1985 [JP] Japan ................................. 60-236751

[51] Int. Cl.[4] .............................................. G02B 5/18
[52] U.S. Cl. ............................ 350/162.21; 350/162.23
[58] Field of Search ............ 350/162.2, 16.21, 162.23, 350/162.24

[56] References Cited

U.S. PATENT DOCUMENTS

| | | | |
|---|---|---|---|
| 3,911,479 | 10/1975 | Sakurai | 350/162.2 |
| 4,568,147 | 2/1985 | Seymour et al. | 350/162.2 |
| 4,598,977 | 7/1986 | Kobayashi | 350/162.2 |

*Primary Examiner*—Gene Wan
*Attorney, Agent, or Firm*—Ostrolenk, Faber, Gerb & Soffen

[57] ABSTRACT

A combination pattern-refraction modification type phase grating comprises dual grating elements which are regularly arranged and each includes convex and concave portions which have respectively different thickness and are formed of material respectively different in refractive index so as to combine respective characteristics of a pattern and a refraction modification type phase grating.

7 Claims, 2 Drawing Sheets

PHASE GRATINGS OF A COMBINATION PATTERN-REFRACTION MODIFICATION TYPE

BACKGROUND OF THE INVENTION

The present invention relates to phase gratings for diffracting light beams by phase control, and more particularly, to phase gratings which have combined characteristics of a pattern modification type and a refraction modification type phase grating.

In general, a phase change P which is caused when light beams of wavelength λ travel a distance D within a light medium of a refractive index n is shown by the equation $$P = \frac{2\pi}{\gamma} Dn.$$

When a periodic distribution of the phase variation P is caused on an exit plane of the light medium due to variations in the distance D and the refractive index n, the light beams are diffracted in such a direction that light beam components with different phase changes P amplify each other by phase matching.

Conventional phase gratings are broadly divided into the following two categories. One, as shown in FIG. 3, is a pattern modification type phase grating 1A which comprises a transparent plate 2A including regularly arranged convex-concave portions a, b for controlling phases of light beams and the other, as shown in FIG. 4, is a refraction modification type phase grating 1B which comprises a transparent plate 2B including regularly arranged layers a', b' of different refractive indexes, respectively, for controlling phases of light beams which pass therethrough.

The phase grating 1A shown in FIG. 3 is in common use for light branching elements, diffraction gratings for dividing light beams, Fresnel lenses and the like. With the phase grating 1A, however, in order to amplify diffracted light beams other than zero-order diffracted light beams by suppressing the latter, it is necessary to increase the difference in level of regularly arranged convex-concave portions, so that a high degree precision working is required when the diffraction angle is increased by minimizing a pitch of the convex-concave portions, resulting in difficulty in manufacturing phase gratings 1A.

In the phase grating 1B shown in FIG. 4, a method for amplifying diffracted light beams other than zero-order diffracted light beams by suppressing the latter is to increase the difference in refractive index between regularly arranged layers or thickness of the grating 1B. However, the increasable range of difference in refractive index is comparatively limited in practice, so that the phase grating 1B is disadvantageous in that its thickness is extremely increased as compared with the pattern modification type phase grating 1A.

SUMMARY OF THE INVENTION

It is an object of the present invention to provide a phase grating which have combined characteristics of a pattern modification type and a refraction modification type phase grating, in order to easily amplify diffracted light beams other than zero-order diffracted light beams by suppressing the latter more than either pattern and a refraction modification type phase gratings.

According to the present invention, a phase grating, which includes conventional dual grating elements, is constructed by adding a refraction modification type phase grating which has regularly arranged dual grating elements of respectively different refractive indexes to a pattern modification type phase grating which has a structure of variations in thickness, so as to suppress zero-order diffracted light beams more than either of the above two phase gratings and thus to amplify diffracted light beams other than the zero-order ones.

In addition, the dual grating elements may be arranged in two dimensions so that an optical element of a zero-order diffracted light beams and a plurality of diffracted light beams nearest thereto can be obtained.

DETAILED DESCRIPTION OF THE PREFERRED EMBODIMENTS

Figure 1:
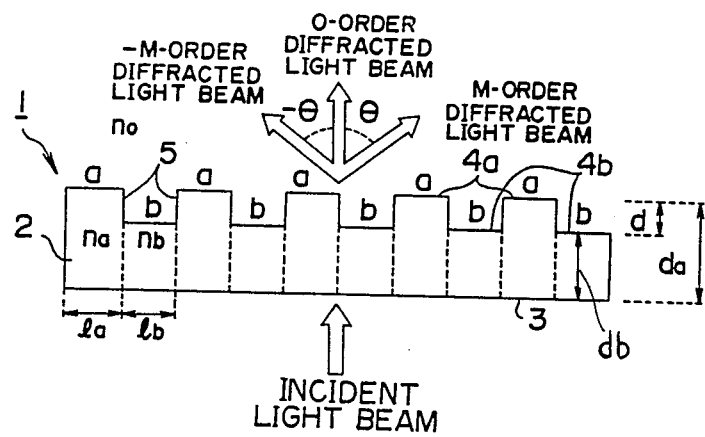
FIG. 1 is an enlarged section view of an embodiment of a phase grating of a combination pattern-refraction modification type according to the present invention.

FIG. 1 illustrates a phase grating 1 of a combination pattern-refraction modification type according to the present invention which includes dual grating elements a, b provided on a transparent flat plate 2 and a flat surface 3 as an incident plane of light rays. The flat incident surface 3 and respective exit surfaces 4a, 4b of the grating elements a, b are parallel to each other and interfaces 5 between the grating elements a, b are perpendicular to the incident surface 3. The grating element a has a refractive index $n_a$ and the grating element b has a refractive index $n_b$.

Now, let us denote symbols as follows:

$d_a$: Thickness of the grating
$l_a$, $l_b$: Respective width of the grating elements a, b
$l = l_a + l_b$: Pitch (width of a unit grating)

$$\left. \begin{array}{l} a_a = l_a/l = \alpha \\ a_b = l_b/l = 1 - \alpha \end{array} \right\} \begin{array}{l} \text{Respective section} \\ \text{fractional factors} \\ \text{of the grating} \\ \text{elements a, b} \end{array}$$

$n_0$: Refractive index of the air, that is, the exterior of the exit surface
λ: Wavelength
m: Integer other than zero $$\theta = \sin^{-1}\left(\frac{m\lambda}{n_0 l}\right):$$

Diffraction angle of exit light rays or $$\mu = \left\{ 1 - \left(\frac{m\lambda}{n_0 l}\right)^2 \right\}^{-\frac{1}{2}}:$$

Reciprocal of cos θ.

In addition, a zero-order diffraction efficiency $\eta_0$ of incident light rays perpendicular to the incident surface 3 of a flat phase grating or a phase grating having a sectional structure in a square waveform and an m-order diffraction efficiency $\eta_m$ are denoted respectively on the basis of an amplitude intensity of a total incident light rays as follows:

$$\eta_0 = 1 - 4\alpha(1 - \alpha) \sin^2 \delta \quad (1)$$

$$\eta_m = \frac{4}{(m\pi)^2} \sin^2 (m\pi\alpha) \sin^2 \delta \quad (2)$$

Where using refractive indexes $n_a$ and $n_b$, a difference in level d of the grating elements a, b, and $\delta^*$ in place of $\delta$, $$\delta^* = \frac{\pi}{\lambda} \{d_a (n_a - n_b) + d(n_b - \mu n_0)\}.$$

Figure 3:
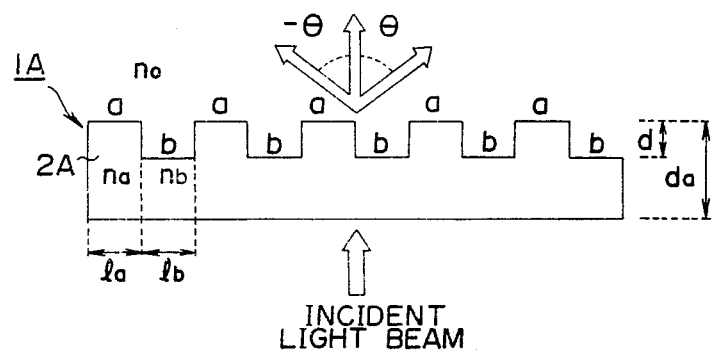
FIG. 3 is an enlarged section view of a phase grating of a conventional pattern modification type.

The phase grating 1A shown in FIG. 3 obtains the following values by placing the refractive indexes $n_a = n_b$ and $\delta = \delta^s$ in the above statements of the phase grating 1 shown in FIG. 1.

$$\delta^s = \frac{\pi}{\lambda} d(n_a - \mu n_0).$$

Figure 4:
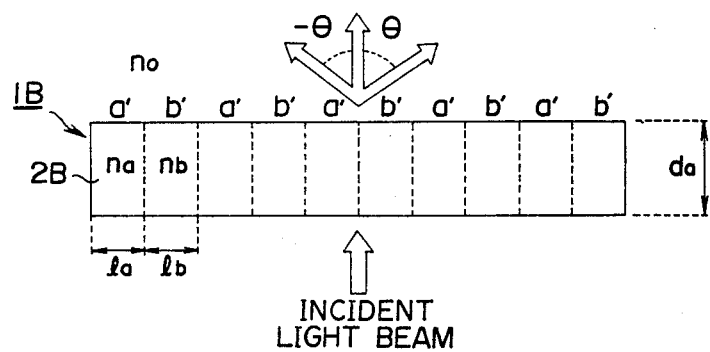
FIG. 4 is an enlarged section view of a phase grating of a conventional refraction modification type.

The phase grating 1B shown in FIG. 4 obtains the following value by placing the difference in level $d = 0$ and $\delta = \delta^r$ in the above statements of the phase grating 1 shown in FIG. 1.

$$\delta^r = \frac{\pi}{\lambda} d_a (n_a - n_b)$$

When the following relationships hold for practical conditions $$0 < \mu n_0 < n_b < n_a \text{ and } 0 \leq d \leq d_a,$$

since $\delta^s > 0$, $\delta^r > 0$, $\delta^* = \frac{\pi}{\lambda} d(n_b - n_0) + \delta^r > 0$, $$\delta^* - \delta^s = \frac{\pi}{\lambda} (d_a - d)(n_a - n_b) > 0,$$

$$\delta^* - \delta^r = \frac{\pi}{\lambda} d(n_b - n_0) > 0,$$

then $\delta^r, \delta^s < \delta^*$.

Accordingly, let $\eta_0$ and $\eta_m$ denote a zero-order and an m-order diffraction efficiency of the phase grating 1, respectively, and $\eta^s_0$, $\eta^s_m$ and $\eta^r_0$, $\eta^r_m$ denote a zero-order and an m-order diffraction efficiency of the phase gratings 1A and 1B, respectively.

Then the following relationships hold:

$$\eta^*_0 < \eta^s_0, \eta^r_0 \text{ and } \eta^*_m > \eta^s_m, \eta^r_m$$

within the following ranges $$\delta^* \leq \frac{\lambda}{2}, \text{ namely, } d \leq \frac{\lambda - 2d_a (n_a - n_b)}{2(n_b - \mu n_0)}$$

This means that when diffraction light rays from phase gratings other than a zero-order diffracted light rays are amplified by suppressing the latter under conditions that corresponding grating constants are the same, the phase grating 1 of the present invention is superior to either of the pattern and refraction modification type phase grating 1A and 1B.

Accordingly, an m-order diffraction efficiency with the phase grating 1A shown in FIG. 3 which has a refractive index $n_a$ and a difference in level d can be obtained with the phase grating 1 of the present invention which has respective refractive indexes $n_a$, $n_b$ ($n_b < n_a$) of its grating elements a, b and its difference in level smaller than d. As a result of this, when a difference in refractive index between the grating elements can be easily given while manufacturing a phase grating whose pitch is particularly small, working conditions for forming the difference in level can be remarkably relieved.

In view of this fact, a phase grating of the combination pattern-refraction modification type of the present invention can be realized by devising materials and methods for easily forming a desired difference in level and refraction index of the grating elements as follows. A solution is prepared by mixing an organic polymer having a photosensitive functional group with a compound which is selectively photosensitive to the functional group. Using the solution, a smooth transparent layer is formed on a transparent substrate by a process such as a spin coating process. The photoreaction of the layer is advanced through a photomask and then non-reacted photoreactive compounds are removed, thus obtaining desired differences in level and refractive index of the grating elements.

The phase grating 1 shown in FIG. 1 has a simplest structure in which an exit light pattern of laser which is perpendicularly incident upon the incident surface 3 shows a diffracted spot group arranged in a straight line around a spot of the zero-order diffracted light rays on a screen arranged in parallel to the grating surface. The present invention, however, is not limited to such phase grating as constructed above.

Figure 2:
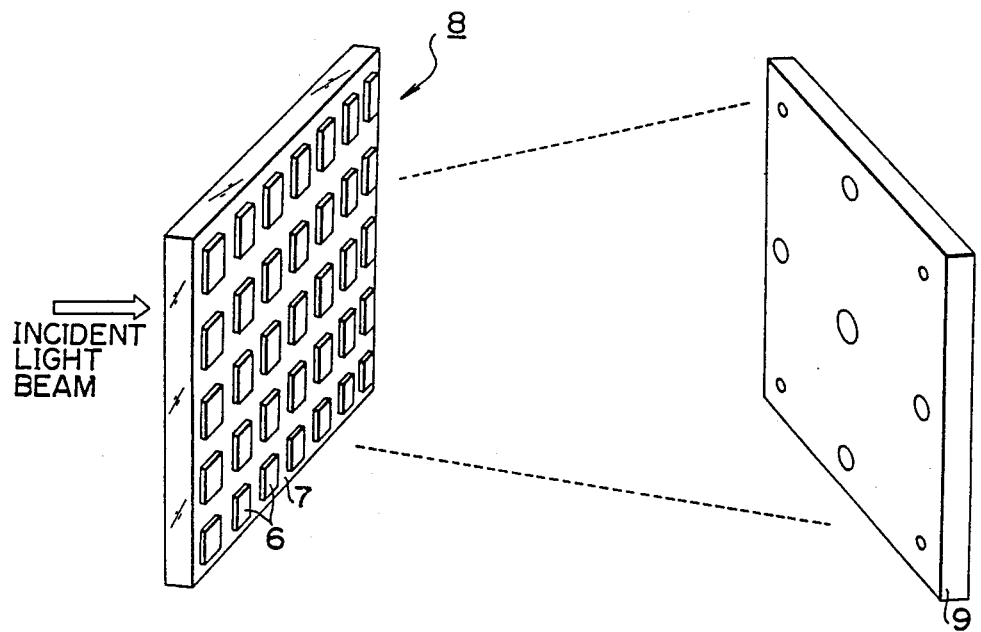
FIG. 2 is a perspective view of another embodiment of a phase grating of the combination pattern-refraction modification type according to the present invention.

By way of example, as shown in FIG. 2, with a phase grating 8 of the combination of pattern-refraction modification type in which a convex portion 6 having a high refractive index and a concave portion 7 having a low refractive index are arranged checkerwise, when laser beams are perpendicularly incident upon an incident surface of the phase grating 8, a different spot group arranged in two-dimensions around a spot of zero-order diffracted light beams on a screen 9 will be observed. The phase grating 8 is an element for obtaining five laser beams equivalent to a zero-order diffracted light beam and four diffracted light beams nearest thereto, for example, from a single laser beam.

Now, the effects of the present invention will be verified using the equations (1) and (2). Tables 1 and 2 indicate diffraction efficiencies in the case of $n_a = 1.51$ and $n_b = 1.50$ and the case of $n_a = 1.55$ and $n_b = 1.45$, respectively, on condition that a wavelength $\lambda = 0.780$ μm, $l_a = 10.0$ μm, $l_b = 10.0$ μm, $d_a = 1.00$ μm and $n_0 = 1.00$.

TABLE 1

| d (μm) | Diffraction efficiencies when $n_a = 1.51$, $n_b = 1.50$ | | | |
|---|---|---|---|---|
| | $n^*_0$ | $n_0^s$ | $n^*_{\pm 1}$ | $n_{\pm 1}^s$ |
| 0.000 | 0.998 | 1.000 | 0.001 | 0.000 |
| 0.100 | 0.943 | 0.958 | 0.023 | 0.017 |
| 0.200 | 0.816 | 0.840 | 0.074 | 0.064 |
| 0.300 | 0.639 | 0.666 | 0.146 | 0.138 |
| 0.400 | 0.440 | 0.464 | 0.228 | 0.218 |
| 0.500 | 0.250 | 0.268 | 0.305 | 0.297 |

TABLE 2

| d (μm) | Diffraction efficiencies when $n_a = 1.55$, $n_b = 1.45$ | | | |
|---|---|---|---|---|
| | $n^*_0$ | $n_0^s$ | $n^*_{\pm1}$ | $n_{\pm1}^s$ |
| 0.000 | 0.846 | 1.000 | 0.062 | 0.000 |
| 0.100 | 0.696 | 0.951 | 0.123 | 0.019 |
| 0.200 | 0.520 | 0.816 | 0.194 | 0.074 |
| 0.300 | 0.342 | 0.620 | 0.267 | 0.155 |
| 0.400 | 0.184 | 0.400 | 0.331 | 0.244 |
| 0.500 | 0.066 | 0.200 | 0.378 | 0.325 |

Diffraction efficiencies of the phase grating 1B shown in FIG. 4 are the same as those when d=0 in the phase grating 1 of the present invention. It is noted that from Tables 1 and 2, the superiority of the phase grating of the present invention in suppression of a zero-order diffracted light beam and amplification of diffracted light beams other than the zero-order diffracted light beam is verified.

For the sake of simplification, Tables 1 and 2 indicate only when m=±1.

In the embodiments described above, while the phase grating has a surface pattern in which the convex portion or concave portion is in the form of a square in section, it is to be understood that the form of a triangle, a trapezoid or a sinusoidal wave in section can be used. In addition, the phase grating of the present invention can be constructed for various uses, particularly being advantageous in distribution and focusing of light beams according to control of diffraction angles and diffraction efficiencies as an element of a microoptical system which deals with light beams on a level of an optical wavelength.

What is claimed is:

1. A phase grating of a combination pattern-refraction modification type comprises:
   dual grating elements including convex and concave portions of thin layers, said portions having different thicknesses, being regularly arranged and being formed of materials different in refractive index so as to provide a difference in refractive index between the convex and the concave portions.

2. A phase grating according to claim 1, in which the refractive index of material forming the convex portion of the dual grating elements is higher than the refractive index of material forming the concave portion.

3. A phase grating according to claim 1 or 2, in which the convex portion of the dual grating elements is formed in the shape of a square in section.

4. A phase grating according to claim 1 or 2, in which the convex portion of the dual gratings is formed in the shape of one of a triangle, a trapezoid and a sinusoidal wave in section.

5. A phase grating according to claim 1 or 2, in which the difference in level between the convex and the concave portions is 0.001 μm or more.

6. A phase grating according to claim 1 or 2, in which the difference in refractive index between the convex and the concave portions is 0.005 or more.

7. A phase grating according to claim 6, in which the difference in level between the convex and concave portions is 0.001 um or more.

* * * * *